United States Patent [19]

Berdan et al.

[11] Patent Number: 5,188,408
[45] Date of Patent: Feb. 23, 1993

[54] MECHANICAL LOCK FOR VEHICLE TRIM PANELS AND THE LIKE

[76] Inventors: Karl Berdan, Lot 14 P.O. Box 175, Midland, Canada, L4R 4K8; Louis Mendes, 8424 E. 12 Mile Rd., Warren, Mich. 48093

[21] Appl. No.: 741,809

[22] Filed: Aug. 8, 1991

[51] Int. Cl.⁵ ............................................. B60R 19/42
[52] U.S. Cl. ..................................... 293/155; 293/128
[58] Field of Search ................ 293/102, 120, 126, 128, 293/142, 155

[56] References Cited

U.S. PATENT DOCUMENTS

| | | | |
|---|---|---|---|
| 3,441,305 | 4/1969 | Trammell, Jr. | 293/128 |
| 3,517,473 | 6/1970 | Kistner et al. | 293/128 X |
| 3,841,044 | 10/1974 | Brown | 293/120 X |
| 4,066,285 | 1/1978 | Hall et al. | 293/128 X |
| 4,652,032 | 3/1987 | Smith | 293/120 |
| 5,108,138 | 4/1992 | Kawaguchi | 293/120 |

FOREIGN PATENT DOCUMENTS

| | | | |
|---|---|---|---|
| 2512171 | 3/1983 | France | 293/128 |
| 869825 | 6/1961 | United Kingdom | 293/120 |

*Primary Examiner*—Johnny D. Cherry
*Assistant Examiner*—Andrew C. Pike
*Attorney, Agent, or Firm*—Keck, Mahin & Cate

[57] ABSTRACT

A vehicle body side molding comprises a trim plate and a rub strip covering part of the trim plate. The rub strip includes tabs integrally formed with the strip and projecting into apertures formed in the trim plate. The periphery of the apertures is formed with resilient barbs that engage the tab and hold it in the aperture. The tabs project from a planar abutment surface that limits movement of the tab into the aperture.

7 Claims, 3 Drawing Sheets

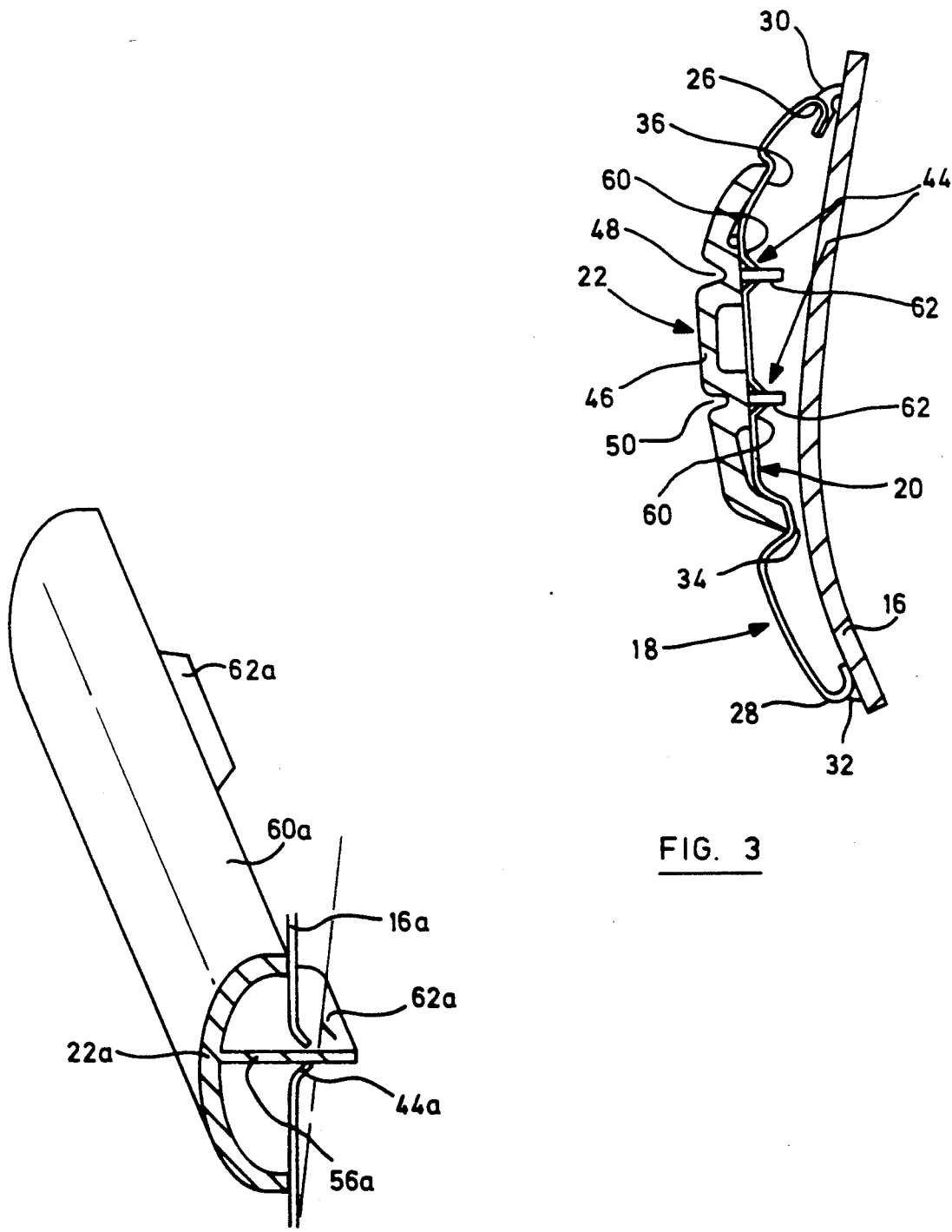

MECHANICAL LOCK FOR VEHICLE TRIM PANELS AND THE LIKE

BACKGROUND OF THE INVENTION

The present invention relates to moldings for use on vehicles such as automobiles.

1. Field of the Invention

It is common to attach a side molding to the body panels of a motor vehicle, in particular the doors and fenders, to act as a protective strip. These moldings may be purely functional in that they absorb small impacts from other vehicles or they may be partially decorative. Conventionally, the moldings include a trim plate that is connected to the panel of the vehicle and a rub strip that covers at least a portion of the trim plate. The rub strip is usually resilient so that it may absorb impacts from other vehicles' doors or the like.

2. Description of the Prior Art

The rub strip is normally attached to the trim plate with adhesive or with mechanical clips. The use of adhesive can be time-consuming and can also make replacement of the strips difficult, particularly if they inadvertently become detached.

Mechanical clips, on the other hand, are more secure but tend to be relatively expensive and time-consuming to assemble.

It is therefore an object of the present invention to provide a body molding in which the above disadvantages are obviated or mitigated.

According to the present invention, there is provided a vehicle body side molding comprising a trim plate for placement against a vehicle body panel and a rub strip extending over at least a portion of the trim plate on a side opposite to the body panel. The trim plate has a plurality of apertures formed therein and receiving a respective one of a plurality of tabs integrally formed with the rub strip. The tabs extend from an abutment surface formed on said rub strip and engageable with said trim plate adjacent to respective ones of said apertures to limit movement of said rub strip toward said plate and locking means acting between the tab and the aperture to secure said rub strip to said trim plate.

BRIEF DESCRIPTION OF THE DRAWINGS

Embodiments of the invention will now be described by way of example only, with reference to the accompanying drawings, in which

FIG. 3 is a section on the line 3—3 of FIG. 2; and

FIG. 4 is a perspective view of an alternative embodiment of one of the components shown in FIGS. 1-3.

DETAILED DESCRIPTION OF THE PREFERRED EMBODIMENTS

Figure 1:
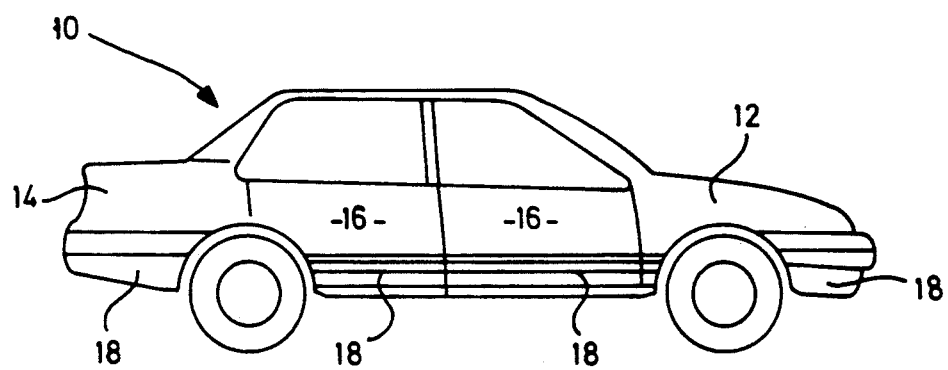
FIG. 1 is a side view of a vehicle including a body molding.
Figure 2:
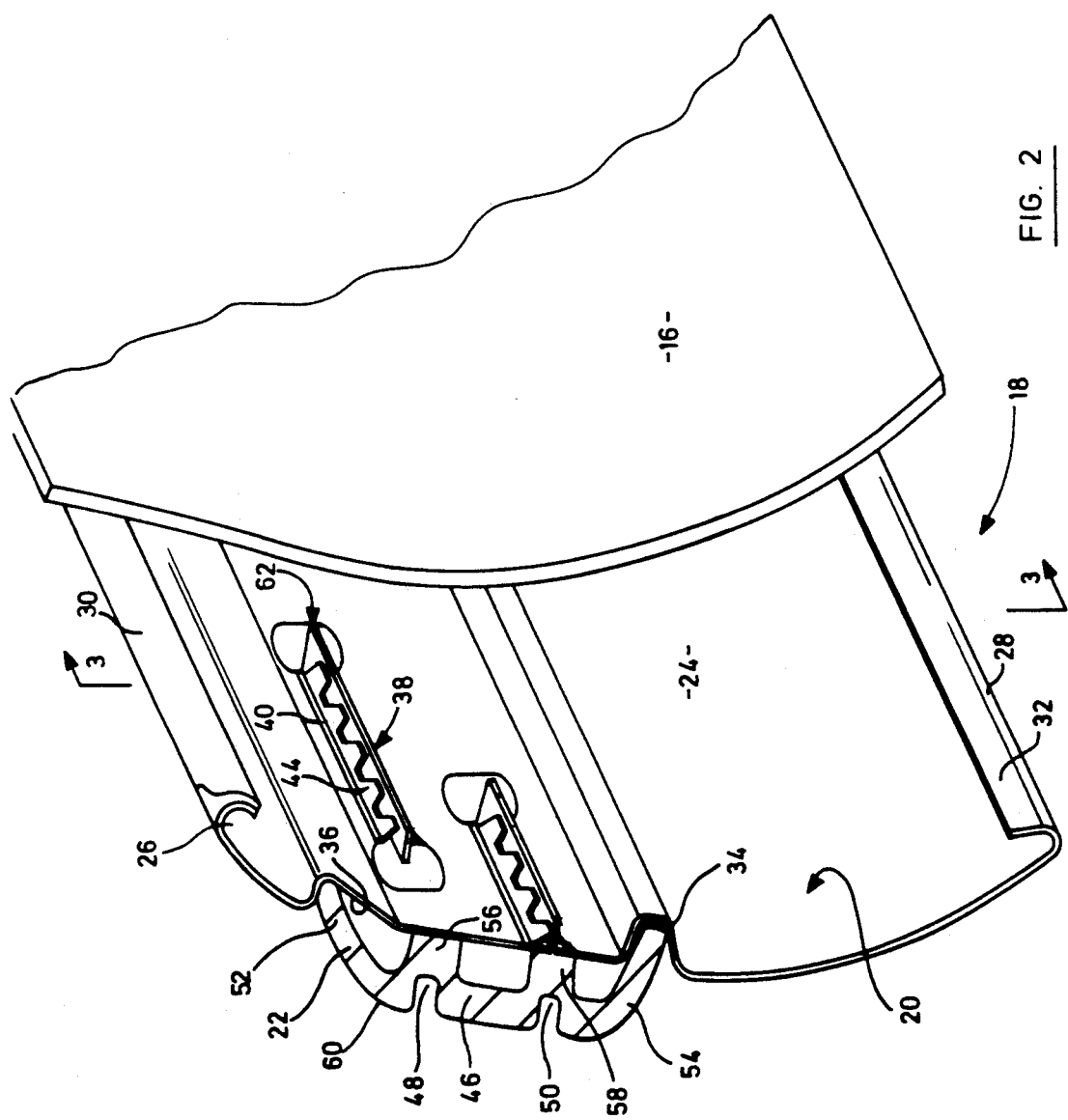
FIG. 2 is a perspective view of the molding and portions of the vehicle shown in FIG. 1.

Referring to FIG. 1, a vehicle 10 includes body panels in the form of a front fender 12, rear fender 14, and door panel 16. Attached to each of the panels are body moldings 18, the details of which can be seen more clearly in FIG. 2.

Each of the body moldings 18 includes a trim plate 20 and a rub strip 22. The trim plate 20 is formed from a steel strip that has been rolled to provide the required concave rear face 24. Upper and lower edges 26,28 of the trim plate 20 are turned over and have sealing strips 30,32 respectively adhered to them. The trim plate 20 is also rolled to provide a central channel 34 that is outwardly directed, i.e. it faces away from the body panel 16. A cuneiform notch 36 is also formed parallel to the channel 34 adjacent the upper edge 26.

Elongate apertures 38 are formed at spaced intervals in the trim plate 20 between the channel 34 and notch 36. Each of the apertures 38 includes spaced parallel sides 40 extending between transverse oval slots 42. Each of the edges 40 is formed with inwardly inclined barbs 44 formed from the material of the trim plate 20 and being inherently resilient.

The rub strip 22 is molded from a suitable plastics material, preferably a resilient plastics material, and is dimensioned to be located between the notch 36 and channel 34 and proud of (i.e., extending laterally beyond) the trim plate 20. In this regard, the rub strip 22 includes a central body portion 46 delimited by longitudinal grooves 48,50. An outwardly concave finger 52 extends from the groove 48 to be received in the notch 36 and an L-shaped finger 54 extends downwardly and inwardly from the groove 50 to the channel 34. A pair of elongate ribs 56,58 are formed on the rear face of the rubbing strip 22 opposite the grooves 48,50. Each of the ribs 56,58 has a rearwardly directed planar surface 60 that abuts against the outwardly directed surface of the trim plate 20.

Integrally formed with the rub strip 22 are a plurality of tabs 62. The tabs 62 are spaced so as to be aligned with the apertures 38 and are generally thin planar tabs that may be received between the barbs 44. Tabs 62 project outwardly from the planar surface 60 so that the surface 60 adjacent to the tab 62 abuts the outer surface of the plate 20 adjacent to the aperture 38.

The tab 62 is dimensioned to be received between the barbs 44 such that they are flexed upon insertion of the tab 62. This causes the barbs 44 to engage the tab and, due to the orientation of the barbs, inhibit removal of the tabs 62 from the aperture 38.

To assemble the rub strip 22 onto the trim plate 20, the rub strip 22 is positioned so that tabs 62 are aligned with the apertures 38. Pressure is then applied to the rub strip 22 to force the tabs 62 between the barbs 44 until the planar surface 60 abuts the outer surface of the trim plate 20. Due to the flexure of the barbs 44, the tab 62 is securely held within the aperture and the rub strip 22 is firmly attached to the trim plate 20. Thereafter, the trim plate may be attached to the vehicle panel 16 by conventional means such as clips.

The assembly of the rub strip 22 to the trim plate 20 is simple, requiring no additional components other than those that may be formed during the normal manufacturing operations of the trim plate and molding of the rub strip. The provision of the abutment surfaces 60 ensures that the rub strip is securely held against the panel but at the same time ensures that the forces imposed on the tab do not deform the outer surface of the rub strip. It will be noted that the tabs 62 are arranged in pairs and it will also be apparent that they are spaced apart along the longitudinal axis of the trim plate 20, typically in the order of 10 inches apart.

In the event that a relatively narrow rub strip is to be utilized, it may not be convenient to provide the pair of ribs 56,58 on the rear surface of the rub strip 22a. In this case, as shown in FIG. 4, a central rib 56a would be molded to the rear surface of the rub strip 22a. The inwardly directed edge 60a of the strip 22a would be scalloped so as to define the tabs 62a and with abutment surfaces 60a between. This again would ensure that local deformation of the outer surface of the strip did not occur due to the spacing of the tabs 62a. Barbs 44a and trim plate 22a are analogous to barbs 44 and trim plate 22 of FIG. 3.

We claim:

1. A vehicle body side molding comprising a trim plate for placement against a vehicle body panel; a rub strip extending over at least a portion of said trim plate on a side of the trim plate opposite to that nearest the body panel, said trim plate having a plurality of apertures formed therein each receiving a respective one of a plurality of tabs integrally formed with said rub strip, said tabs extending from an abutment surface formed on said rub strip and having a generally uniform cross section and a pair of generally planar flanks, said abutment surface being engageable with said trim plate adjacent to respective one of said apertures to limit movement of said rub strip toward said plate; and locking means acting between each said tab and respective ones of said apertures to secure said rub strip to said trim plate, said locking means including resilient fingers extending from the periphery of each said aperture toward and into engagement with said planar flanks of respective ones of said tabs, said fingers being flexed by insertion of respective ones of said tabs into respective ones of said apertures and being maintained flexed by respective ones of said tabs when said abutment surface engages said trim plate, said fingers converging in a direction toward said vehicle body panel to inhibit removal of respective ones of said tabs from respective ones of said apertures.

2. A side molding according to claim 1 wherein said apertures are elongate.

3. A side molding according to claim 1 wherein said abutment surface is formed on a rib extending along said rub strip.

4. A side molding according to claim 3 wherein said rib is disposed opposite a depression formed in the rub strip.

5. A side molding according to claim 3 wherein said rub strip includes a second rib, both said ribs being laterally spaced and each having a plurality of said tabs extending therefrom.

6. A side molding according to claim 5 wherein said plurality of tabs on each of said laterally spaced ribs overlap one another in a longitudinal direction.

7. A side molding according to claim 3 wherein said rib and said tabs are substantially coplanar and said abutment surface is defined by an edge of said rib extending between said tabs.

* * * * *